(12) United States Patent
Ohara

(10) Patent No.: US 7,378,935 B2
(45) Date of Patent: May 27, 2008

(54) VARIABLE RESISTOR

(75) Inventor: Tatsuya Ohara, Tokyo (JP)

(73) Assignee: ALPS Electric Co., Ltd., Tokyo (JP)

( * ) Notice: Subject to any disclaimer, the term of this patent is extended or adjusted under 35 U.S.C. 154(b) by 248 days.

(21) Appl. No.: 11/154,215

(22) Filed: Jun. 15, 2005

(65) Prior Publication Data

US 2005/0285712 A1    Dec. 29, 2005

(30) Foreign Application Priority Data

Jun. 24, 2004    (JP)    ............................. 2004-186786

(51) Int. Cl.
*H01C 10/14*    (2006.01)
(52) U.S. Cl. .................................................. 338/116
(58) Field of Classification Search .................. 338/116
See application file for complete search history.

(56) References Cited

U.S. PATENT DOCUMENTS 3,242,450 A * 3/1966 Bourns et al. .............. 338/164
3,378,803 A * 4/1968 Yungblut et al. ........... 338/174
3,378,804 A * 4/1968 Cartwright .................. 338/174
4,110,722 A * 8/1978 Brendle et al. ............. 338/174

FOREIGN PATENT DOCUMENTS

JP            5-21214         1/1993

\* cited by examiner

*Primary Examiner*—K. Richard Lee
*Assistant Examiner*—Joselito Baisa
(74) *Attorney, Agent, or Firm*—Beyer Law Group LLP

(57) ABSTRACT

A variable resistor includes a reduction rotation transmission mechanism including a plurality of gears for transmitting rotation of an operating member, a resistance member including a rotary member for varying resistance, and a rotation transmission member for rotating the rotary member. A plate-shaped clutch is disposed between the rotation transmission member and a geared wheel disposed at a termination end of the reduction rotation transmission mechanism, so that a clutch mechanism is formed. The transmission of the rotation of the rotation transmission member is performed and the rotation of the rotation transmission member is stopped by the clutch mechanism.

8 Claims, 7 Drawing Sheets

VARIABLE RESISTOR

BACKGROUND OF THE INVENTION

1. Field of the Invention

The present invention relates to a variable resistor suitable for use in, for example, detecting a tilt angle of a seat in an automobile.

2. Description of the Related Art

A related variable resistor will be described with reference to FIGS. 9 and 10. FIG. 9 is a vertical sectional view of the main portion of the related variable resistor. FIG. 10 is a transverse sectional view of the main portion of the related variable resistor. In the structure of the related variable resistor shown in FIGS. 9 and 10, a resistance element (not shown) and a resistance substrate 53 to which a terminal 52 is mounted are disposed in a recess of an exterior case 51 formed of an insulating material.

A rotor 55 having a sliding element 54 which slidably contacts the resistance element is mounted in the recess of the exterior case 51. Although not shown, a stopper is disposed between the rotor 55 and the exterior case 51 for stopping the rotation of the rotor 55.

An inner toothed portion 51a is formed on the inner peripheral surface defining the recess of the exterior case 51, and a groove 55a for accommodating a planetary disc 56 formed of rubber is formed in the rotor 55. The circular outer peripheral surface of the planetary disc 56 comes into resilient contact with the inner toothed portion 51a.

An operating member 57 having a cross-shaped driver groove 57a and an externally toothed gear 57b is rotatably mounted to the top portion of the exterior case 51. The externally toothed gear 57b of the operating member 57 is positioned in the groove 55a and resiliently contacts the circular outer peripheral surface of the planetary disc 56, and pushes the planetary disc 56 against the inner toothed portion 51a. This causes the inner toothed portion 51a, the planetary disc 56, and the externally toothed gear 57b to form a reduction rotation transmission mechanism based on a planetary gear mechanism, and a clutch mechanism.

The resistance substrate 53 is secured to the lower portion of the exterior case 51 by filling the lower portion of the exterior case 51 with resin. Accordingly, the related variable resistor is formed.

In the related variable resistor having the aforementioned structure, when the operating member 57 is rotated in the direction of arrow A1 with a driver, the externally toothed gear 57b also rotates in the direction of arrow A1. Therefore, the planetary disc 56 rotates in the direction of arrow A2 by friction between the externally toothed gear 57b and the inner toothed portion 51a.

When the planetary disc 56 rotates in the direction of arrow A2, the rotor 55 is pushed and rotates in the direction of arrow A3. As a result, the sliding element 54 comes into sliding contact with the resistance element, causing the resistance to vary. Continuing the rotation of the operating member 57 causes the rotor 55 to bump into the stopper at the exterior case 51, and to stop rotating. Further continuing the rotation of the operating member 57 causes a slip to occur between the externally toothed gear 57b and the planetary disc 56. (Refer to, for example, Japanese Unexamined Patent Application Publication No. 5-21214.)

However, the related variable resistor comprises a clutch mechanism using the rubber planetary disc 56. Therefore, when the rotation of the operating member 57 is continued while the rotation of the rotor 55 is stopped, the rotation of the externally toothed gear 57b in resilient contact with the planetary disc 56 causes considerable wearing of the planetary disc 56. As a result, in addition to not being possible to maintain the clutch mechanism and the reduction rotation transmission mechanism over a long period of time, the resistance cannot be finely because the reduction ratio in the planetary gear mechanism using one planetary disc 56 is small.

Since the related variable resistor comprises a clutch mechanism using the rubber planetary disc 56, it has the problem that it is not possible to maintain the clutch mechanism and the reduction rotation transmission mechanism over a long period of time because when the rotation of the operating member 57 is continued while the rotation of the rotor 55 is stopped, the rotation of the externally toothed gear 57b in resilient contact with the planetary disc 56 causes considerable wearing of the planetary disc 56.

SUMMARY OF THE INVENTION

Accordingly, it is an object of the present invention to provide a variable resistor comprising a clutch mechanism and a reduction rotation transmission mechanism having long lives, and which can finely vary resistance.

According to a basic form of the present invention, there is provided a variable resistor comprising an operating member rotatably supported by a case and having a gear, a reduction rotation transmission mechanism including a plurality of gears for transmitting rotation of the operating member, a resistance member having a rotary member for varying resistance, and a rotation transmission member for rotating the rotary member. In the variable resistor, a plate-shaped clutch which resiliently contacts a geared wheel and the rotation transmission member is disposed between the geared wheel and the rotation transmission member, so that a clutch mechanism is formed, the geared wheel being disposed at a termination end of the reduction rotation transmission mechanism. The rotation from the operating member is transmitted to the rotary member through the reduction rotation transmission mechanism, the clutch mechanism, and the rotation transmission member to vary resistance. When the rotation of the rotation transmission member is stopped, the clutch mechanism slips to stop varying the resistance.

In a first form based on the basic form, the clutch comprises a wave washer formed of a metallic plate having a spring characteristic.

In a second form based on the basic form, the geared wheel has a through hole in a central portion, the rotation transmission member has a plurality of stopping portions which are stopped by the geared wheel as a result of inserting the stopping portions in the through hole, and the rotation transmission member is combined with the geared wheel by the stopping portions.

In a third form based on the second form, the clutch has an annular portion having an opening in a central portion, and is interposed between the rotation transmission member and the geared wheel by inserting the stopping portions in the opening.

In a fourth form based on the second form, the case has a protrusion, and the stopping portions are prevented from being dislodged from the geared wheel by positioning the protrusion in the through hole of the geared wheel.

In a fifth form based on the basic form, the variable resistor further comprises a holding member for holding the resistance member, in which a stopper for stopping the rotation of the rotation transmission member is disposed between the rotation transmission member and the holding member.

In a sixth form based on the fifth form, the holding member has a connection conductor for connecting a terminal disposed at the resistance member, and a resistance value of the resistance member is provided to the outside of the case through the connection conductor.

In a seventh form based on the fifth form, the holding member is caught and stopped by the case by a stopper protrusion of the case.

In an eighth form based on the basic form, the rotary member has a hole in a central portion, and the rotation transmission member has a shaft inserted in the hole of the rotary member to transmit the rotation to the rotary member.

In a ninth form based on the basic form, the case comprises first and second case portions, a protrusion disposed at one of the first and second case portions, and a stopper arm disposed at the other of the first and second case portions, the case is a box case obtained by catching and stopping the protrusion and the stopper arm with respect to each other, and the case accommodates at least the reduction rotation transmission mechanism, the rotation transmission member, the clutch mechanism, and the resistance member.

In a tenth form based on the ninth form, the operating member is held between the first and second case portions, and at least one of the gears of the reduction rotation transmission mechanism is rotatably supported by a shaft formed by a protrusion disposed at either one of the first and second case portions.

In an eleventh form based on the ninth form, at least one of the gears of the reduction rotation transmission mechanism is rotatably supported by the operating member.

As mentioned above, the variable resistor comprises an operating member rotatably supported by a case and having a gear, a reduction rotation transmission mechanism including a plurality of gears for transmitting rotation of the operating member, a resistance member having a rotary member for varying resistance, and a rotation transmission member for rotating the rotary member. In the variable resistor, a plate-shaped clutch which resiliently contacts a geared wheel and the rotation transmission member is disposed between the geared wheel and the rotation transmission member, so that a clutch mechanism is formed, the geared wheel being disposed at a termination end of the reduction rotation transmission mechanism. The rotation from the operating member is transmitted to the rotary member through the reduction rotation transmission mechanism, the clutch mechanism, and the rotation transmission member to vary resistance. When the rotation of the rotation transmission member is stopped, the clutch mechanism slips to stop varying the resistance.

Accordingly, when a plate-shaped clutch is interposed between the flat portions of the geared wheel and the rotation transmission member, less wearing occurs than in a related variable resistor. Therefore, it is possible to maintain the clutch mechanism and the reduction rotation transmission mechanism over a long period of time, so that, not only is the variable resistor highly reliable, but also it can finely vary the resistance due to a large reduction ratio achieved by the reduction rotation transmission mechanism comprising a plurality of gears.

Since the clutch comprises a wave washer formed of a metallic plate having a spring characteristic, the clutch can be made more durable, so that the clutch mechanism and the reduction rotation transmission mechanism can be maintained over a long period of time. Thus, a highly reliable variable resistor is provided.

Since the geared wheel has a through hole in a central portion, the rotation transmission member has a plurality of stopping portions which are stopped by the geared wheel as a result of inserting the stopping portions in the through hole, and the rotation transmission member is combined with the geared wheel by the stopping portions, the rotation transmission member and the geared wheel in an integrated state can be incorporated into the case, so that high productivity is achieved.

Since the clutch has an annular portion having an opening in a central portion, and is interposed between the rotation transmission member and the geared wheel by inserting the stopping portions in the opening, the rotation transmission member, the geared wheel, and the clutch can be easily integrated. In the integrated state, they can be incorporated into the case, so that high productivity is achieved.

Since the case has a protrusion, and the stopping portions are prevented from being dislodged from the geared wheel by positioning the protrusion in the through hole of the geared wheel, reliable mounting of the rotation transmission member is achieved, so that the mounting can be highly resistant to vibration and shock.

Since the variable resistor further comprises a holding member for holding the resistance member, and has a stopper for stopping the rotation of the rotation transmission member disposed between the rotation transmission member and the holding member, the demand for different rotation ranges can be satisfied by only changing the holding member, so that the variable resistor can easily provide a variety of rotation ranges and the resistance member can be used in common without being changed, as a result of which costs are reduced.

Since the holding member has a connection conductor for connecting a terminal disposed at the resistance member, and a resistance value of the resistance member is provided to the outside of the case through the connection conductor, the holding member is changed in order to achieve a different form of external connection, so that the variable resistor can easily allow a variety of forms of external connection.

Since the holding member is caught and stopped by the case by a stopper protrusion of the case, the holding member is easily mounted to the case, and good productivity is achieved.

Since the rotary member has a hole in a central portion, and the rotation transmission member has a shaft inserted in the hole of the rotary member to transmit the rotation to the rotary member, after incorporating the resistance member into the case, the shaft of the rotation transmission member can be inserted into the hole in the rotary member, so that proper assembly is achieved.

Since the case comprises first and second case portions, a protrusion disposed at one of the first and second case portions, and a stopper arm disposed at the other of the first and second case portions, the case is a box case obtained by catching and stopping the protrusion and the stopper arm with respect to each other, and the case accommodates at least the reduction rotation transmission mechanism, the rotation transmission member, the clutch mechanism, and the resistance member, the case is easily assembled and high dust resistance is achieved.

Since the operating member is held between the first and second case portions, and at least one of the gears of the reduction rotation transmission mechanism is rotatably supported by a shaft formed by a protrusion disposed at either one of the first and second case portions, the operating member is reliably held, at least one of the gears is easily mounted and supported, and good productivity is achieved.

Since at least one of the gears of the reduction rotation transmission mechanism is rotatably supported by the operating member, a proper gear space factor is achieved, so that the case can be reduced in size.

DESCRIPTION OF THE PREFERRED EMBODIMENTS

Figure 1:
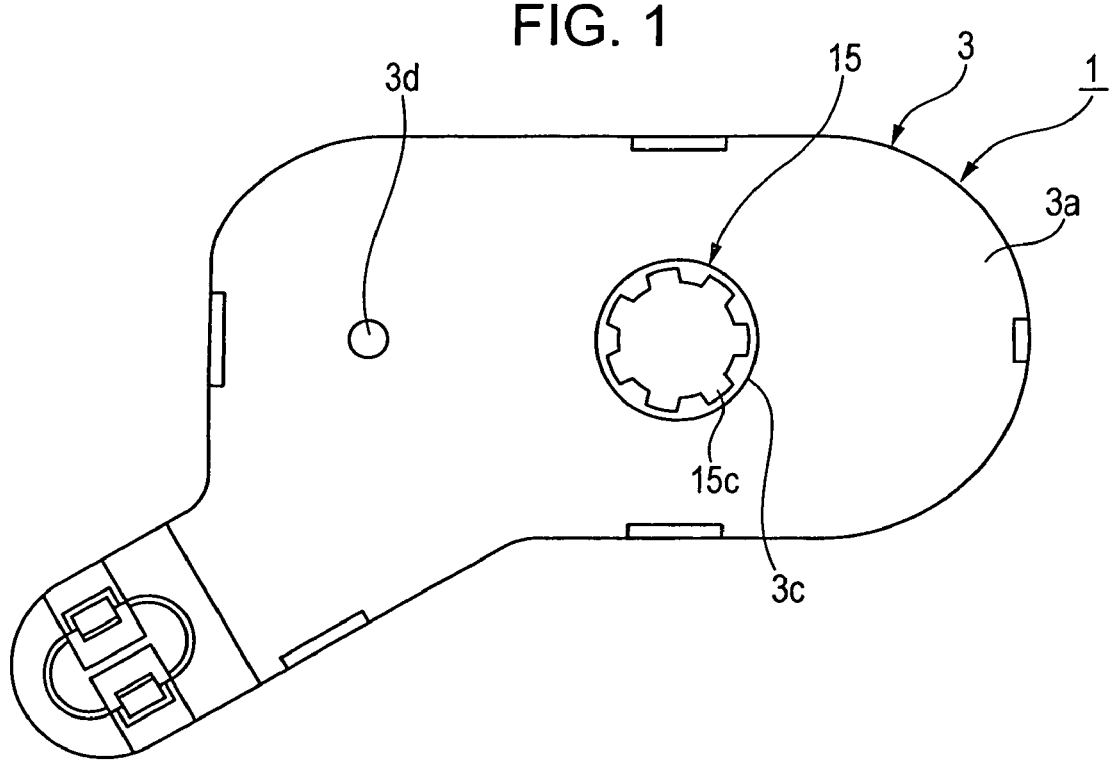
FIG. 1 is a plan view of a variable resistor in accordance with the present invention.
Figure 2:
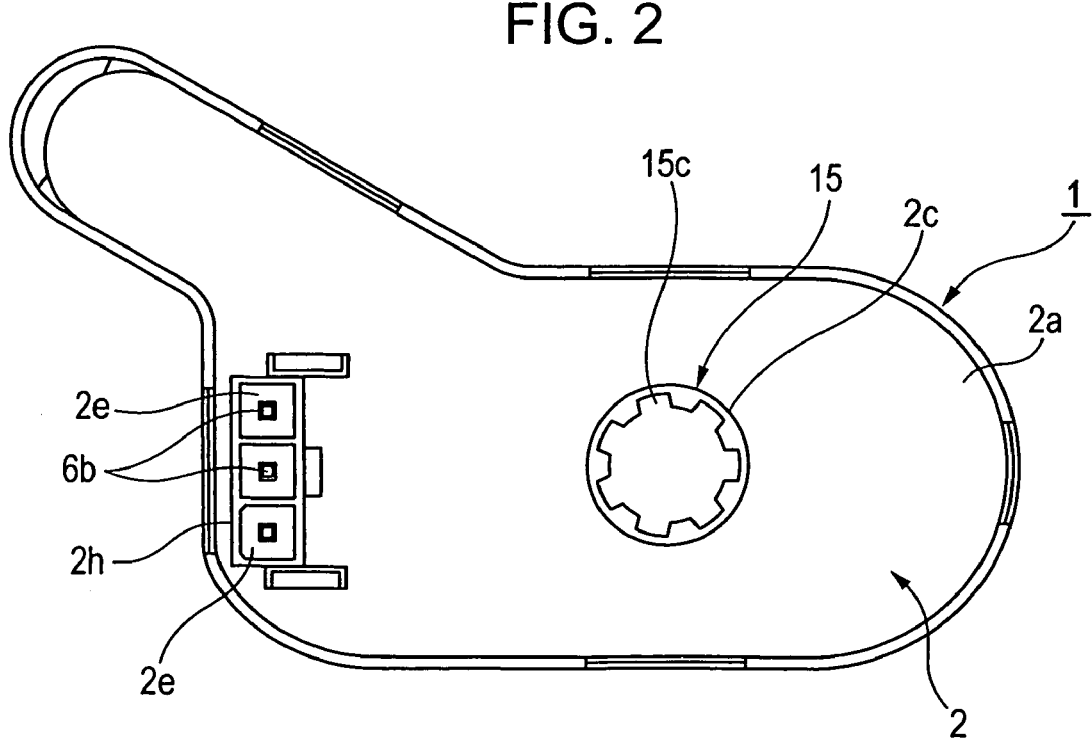
FIG. 2 is a bottom view of the variable resistor in accordance with the present invention.
Figure 3:
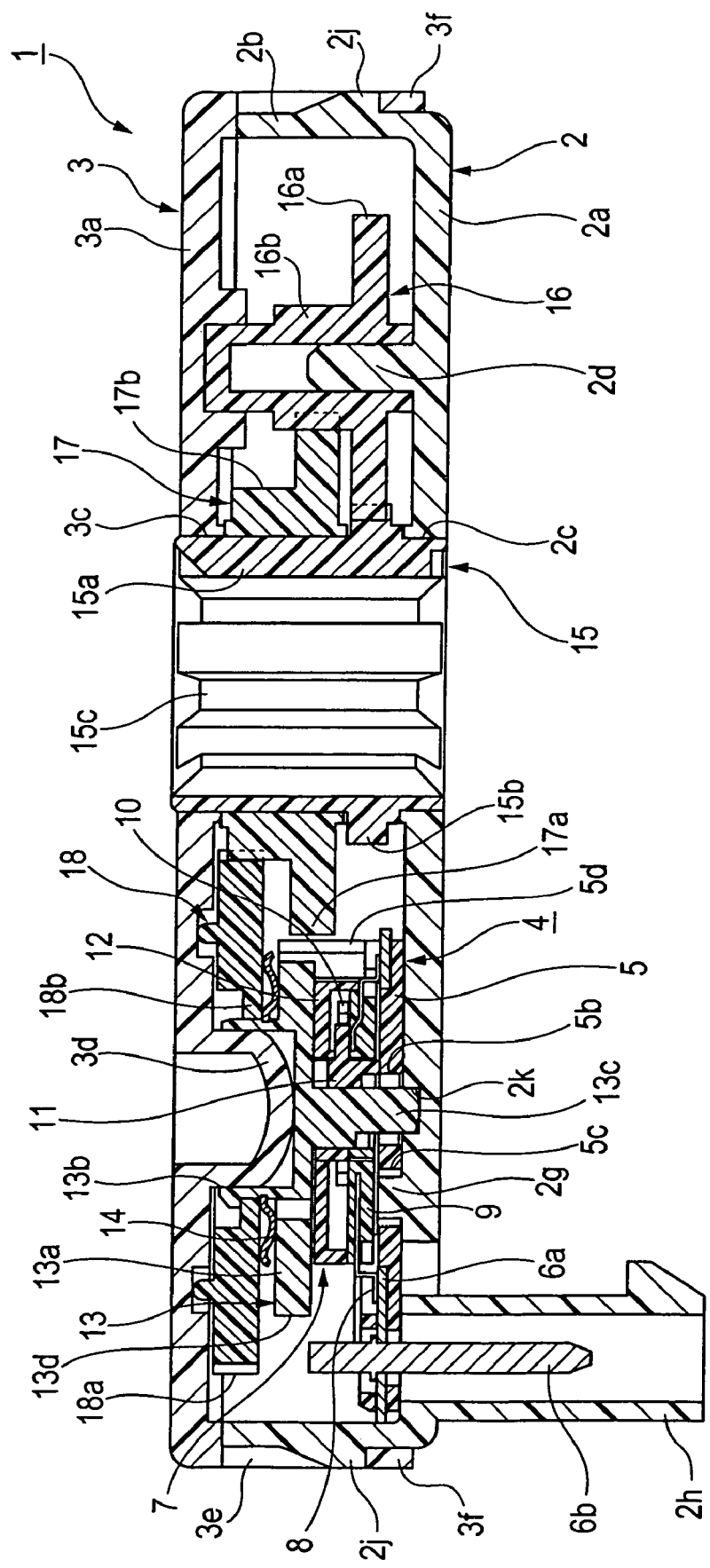
FIG. 3 is a sectional view of the main portion of the variable resistor in accordance with the present invention.
Figure 4:
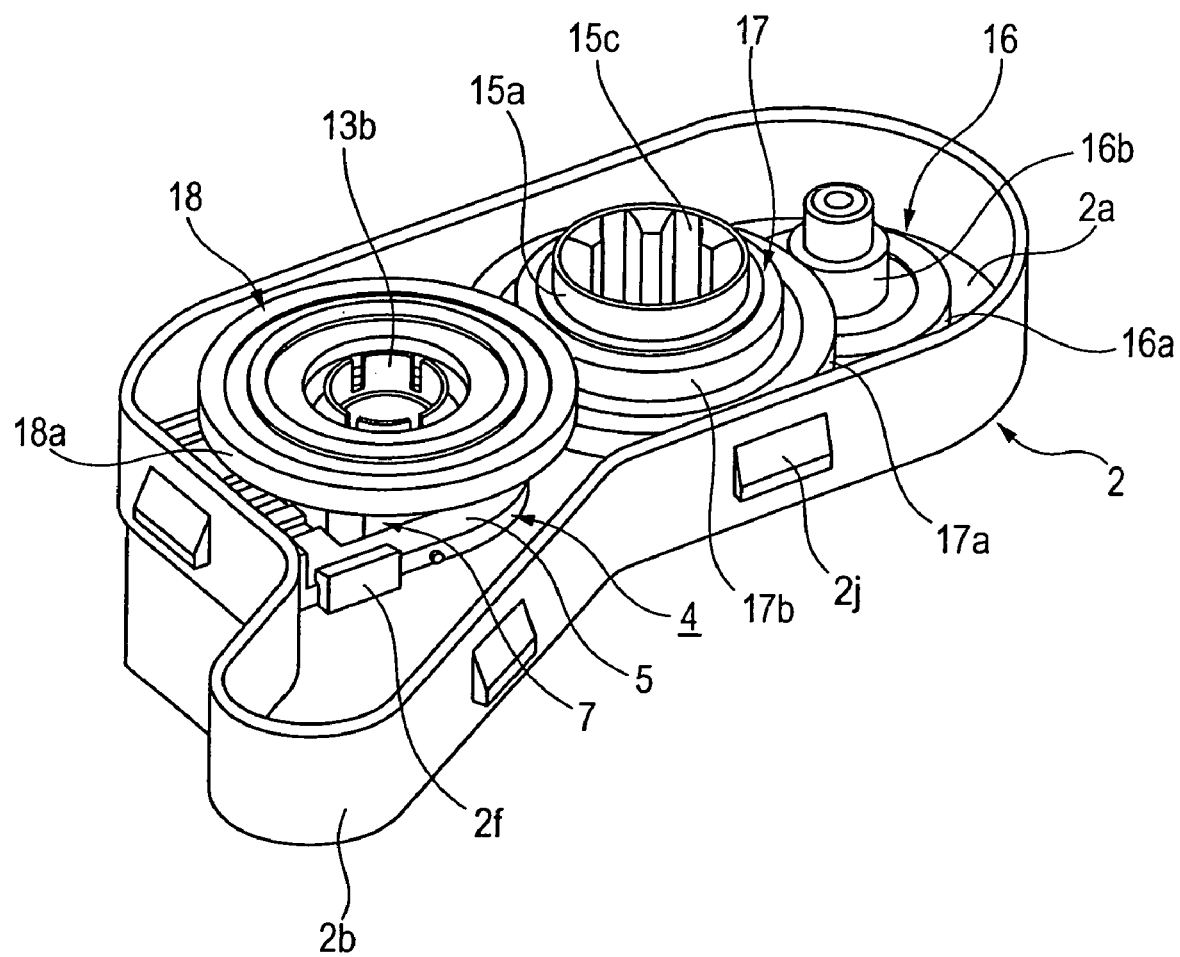
FIG. 4 is a perspective view of the variable resistor in accordance with the present invention resulting from removal of a second case portion.
Figure 5:
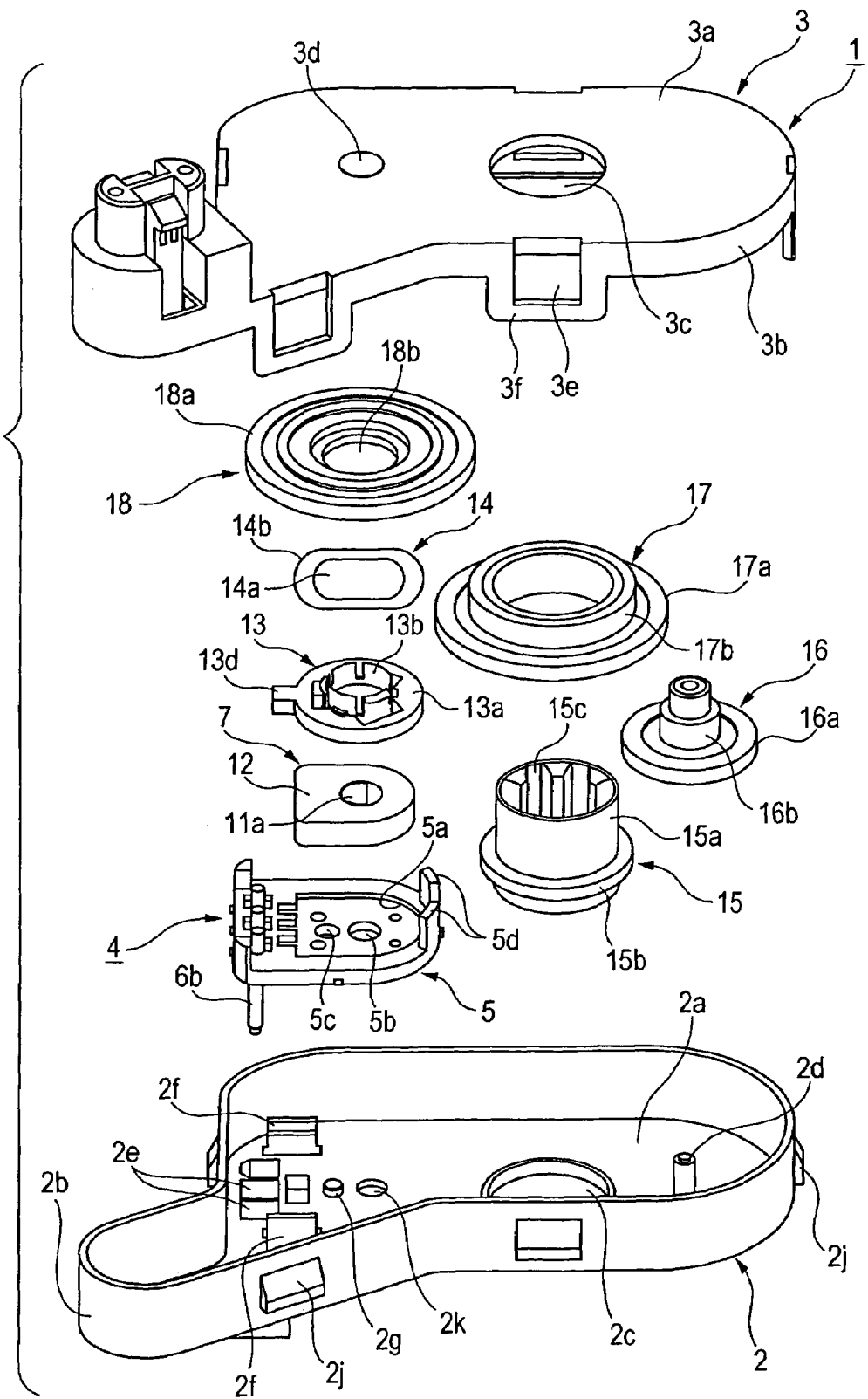
FIG. 5 is an exploded perspective view of the variable resistor in accordance with the present invention.
Figure 6:
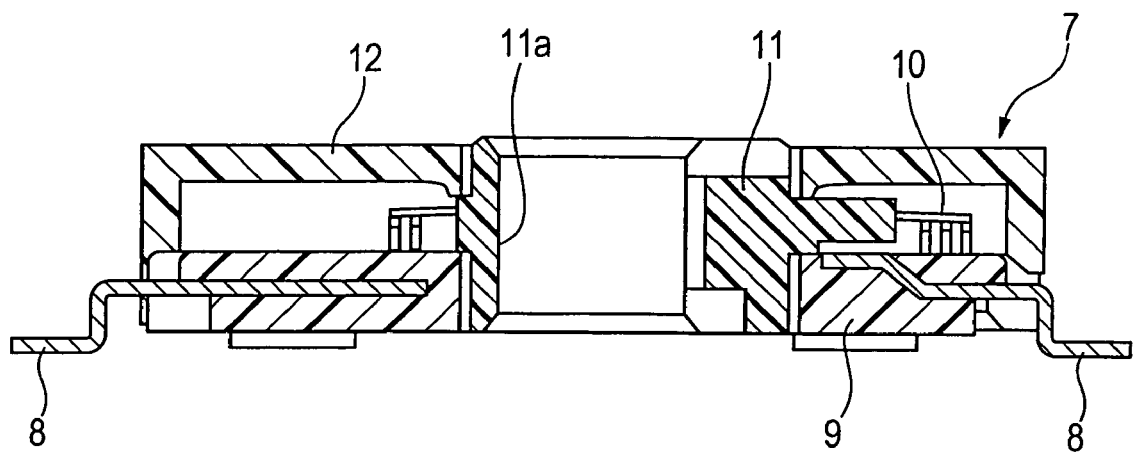
FIG. 6 is a sectional view of a resistance member of the variable resistor in accordance with the present invention.
Figure 7:
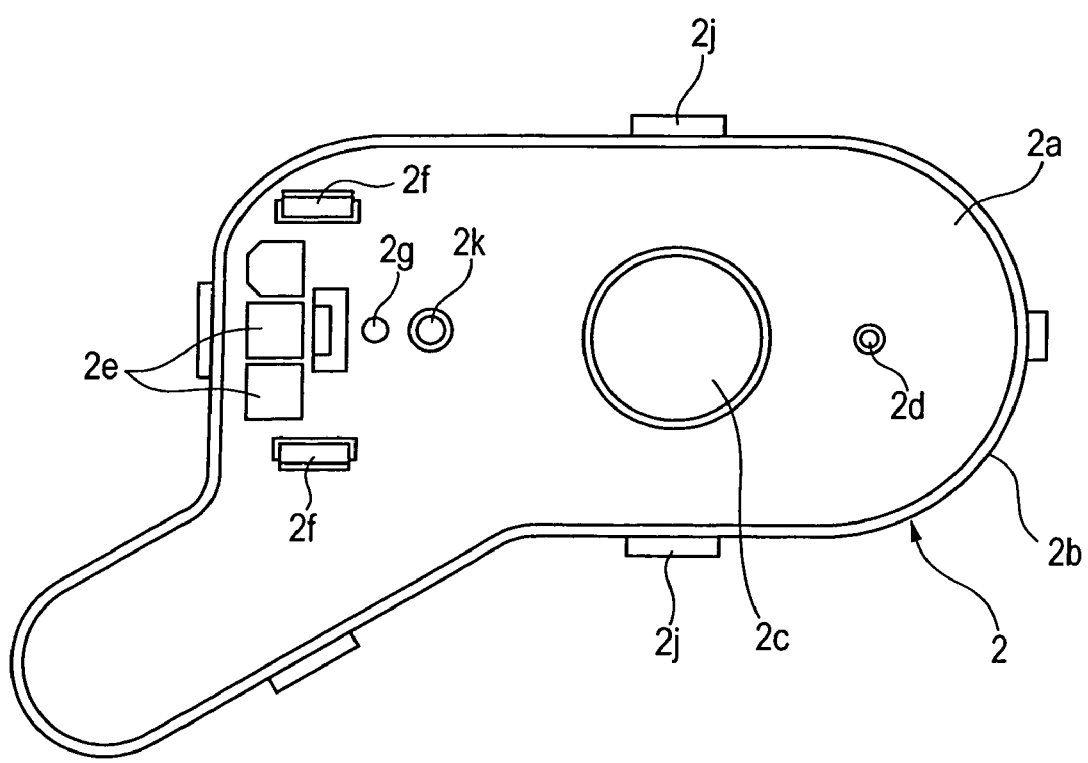
FIG. 7 is a plan view of a first case portion of the variable resistor in accordance with the present invention.
Figure 8:
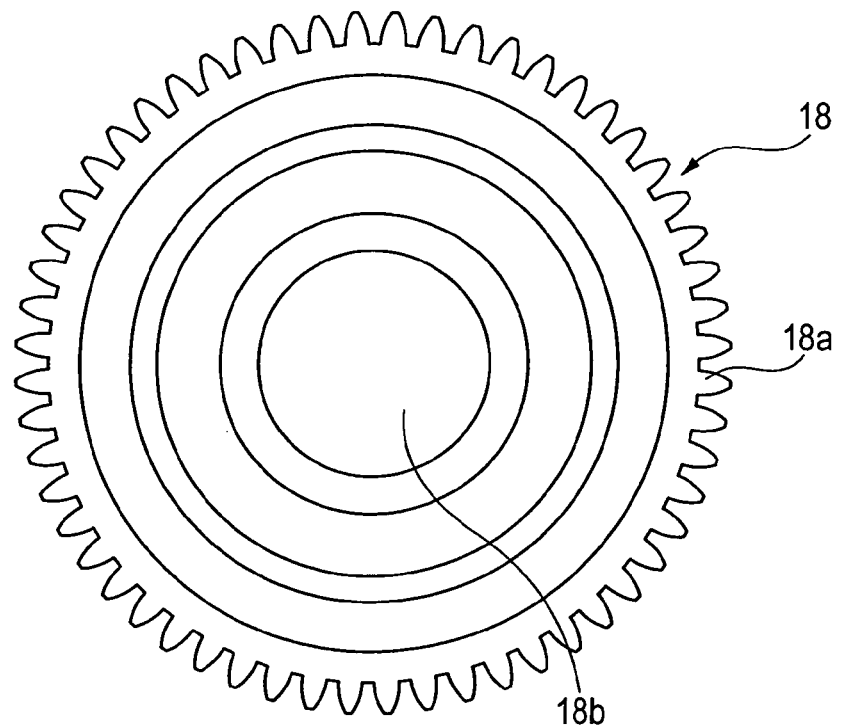
FIG. 8 is a plan view of a geared wheel of the variable resistor in accordance with the present invention.
Figure 9:
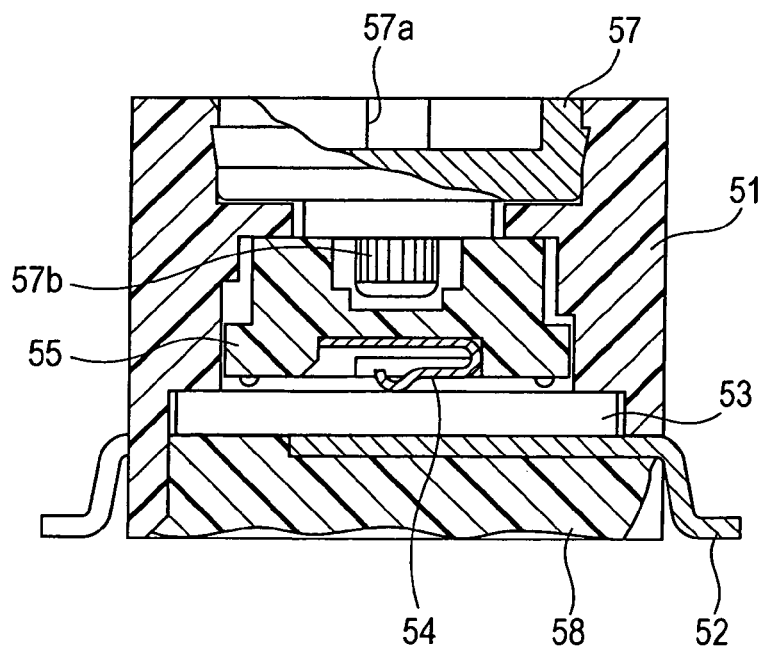
FIG. 9 is a vertical sectional view of the main portion of a related variable resistor.
Figure 10:
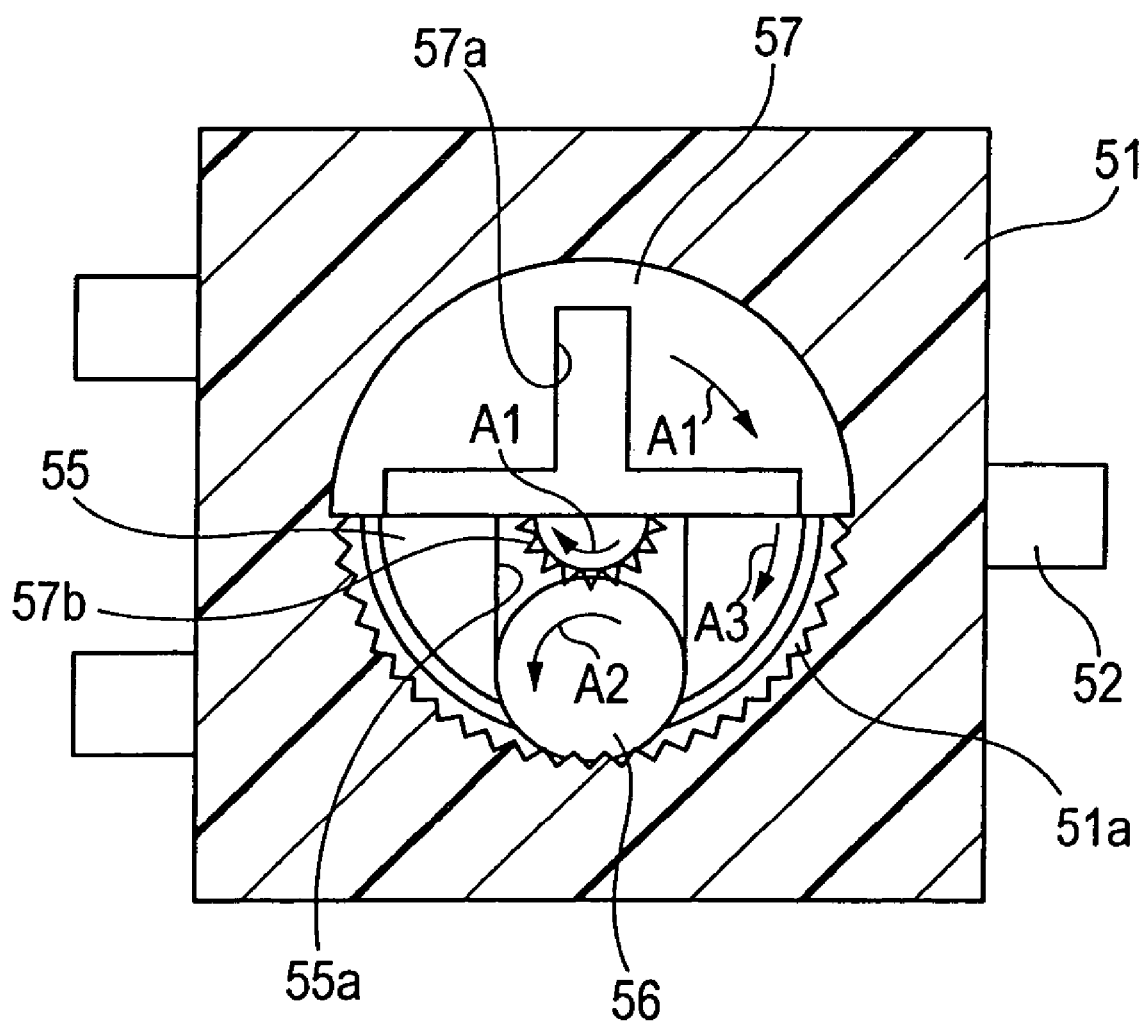
FIG. 10 is a transverse sectional view of the main portion of the related variable resistor.

The figures used to describe a variable resistor in accordance with the present invention are FIGS. 1 to 8. FIG. 1 is a plan view of the variable resistor in accordance with the present invention. FIG. 2 is a bottom view of the variable resistor in accordance with the present invention. FIG. 3 is a sectional view of the main portion of the variable resistor in accordance with the present invention. FIG. 4 is a perspective view of the variable resistor in accordance with the present invention resulting from removal of a second case portion. FIG. 5 is an exploded perspective view of the variable resistor in accordance with the present invention. FIG. 6 is a sectional view of a resistance member of the variable resistor in accordance with the present invention. FIG. 7 is a plan view of a first case portion of the variable resistor in accordance with the present invention. FIG. 8 is a plan view of a geared wheel of the variable resistor in accordance with the present invention.

For the sake of easier understanding of the drawings, in FIGS. 3, 4, and 5, first to third gears and teeth (bumpy portions) of the geared wheel are not illustrated.

The structure of the variable resistor in accordance with the present invention will be described with reference to FIGS. 1 to 8. A box case 1, which is a product molded out of synthetic resin, has first and second case portions 2 and 3 that are combined and integrated together. The lower first case portion 2 has a bottom wall 2a, a side wall 2b extending upward from the outer periphery of the bottom wall 2a and defining an accommodation portion, a relatively large hole 2c in the bottom wall 2a, a shaft 2d disposed close to the hole 2c and protruding from the bottom wall 2a, a plurality of lead-out holes 2e disposed in the bottom wall 2a so as to be in parallel opposite to the shaft 2d with the hole 2c in between, a pair of stopper protrusions 2f disposed on the bottom wall 2a so as to be on both sides of the lead-out holes 2e, a protrusion 2g disposed on the bottom wall 2a so as to be interposed between the stopper protrusions 2f, a cylindrical portion 2h protruding outward (downward) from the bottom wall 2a so as to surround the lead-out holes 2e, a plurality of protrusions 2j disposed at the outer peripheral surface of the side wall 2b, and a recess 2k disposed in the bottom wall 2a so as to be close to the protrusion 2g and to face the hole 2c.

The upper second case portion 3 has an upper wall 3a, a side wall 3b extending downward from the outer periphery of the upper wall 3a and defining the accommodation portion, a large hole 3c formed in the upper wall 3a, a protrusion 3d disposed at the upper wall 3a and forming a shaft, and a plurality of stopper arms 3f extending downward from the side wall 3b and having openings 3e.

By bringing the side walls 2b and 3b together and snappingly stopping the protrusions 2j by the openings 3e in the stopper arms 3f, the first and second case portions 2 and 3 are fitted together, so that the case 1 having the accommodation portion therein is formed.

When the first and second case portions 2 and 3 are fitted together, the holes 2c and 3c oppose each other.

A holding member 4 comprises an insulating base 5 and connection conductors 6a and 6b mounted to the insulating base 5. The insulating base 5 has a recess 5a formed in the top surface, two holes 5b and 5c formed apart from each other, and upwardly protruding stoppers 5d. The insulating base 5 is placed on the bottom wall 2a while the protrusion 2g is disposed and positioned in the hole 5c. Both sides of the insulating base 5 are snappingly stopped by the pair of stopper protrusions 2f and mounted to the bottom wall 2a.

Here, the connection conductor 6b is positioned in the cylindrical portion 2h, becomes an outgoing terminal for a connector, and is lead out from the case 1.

A resistance member 7 has an arcuate resistance element (not shown), and comprises an insulating plate 9 having a plurality of terminals 8 buried therein, a sliding element 10 which comes into sliding contact with the resistance element, a rotary member 11 having a non-circular hole 11a (D-shaped in the embodiment) formed in the center thereof, and a cover 12 which is mounted to the insulating plate 9 while covering the resistance element and the sliding element 10 and which supports the rotary member 11.

The resistance member 7 is mounted to the holding member 4 by soldering the terminal 8 to the connection conductor 6a with the insulating plate 9 being disposed and positioned in the recess 5a.

A rotary transmission member 13, which is a product molded out of synthetic resin, has a flat portion 13a, a plurality of stopping portions 13b protruding upward from the flat portion 13a, a shaft 13c which protrudes downward from the center of the flat portion 13a and which is non-circular (D-shaped in the embodiment), and a stopper 13d protruding outward from the outer periphery of the flat portion 13a.

The rotation transmission member 13 is inserted while the non-circular shaft 13c engages the hole 11a of the non-circular rotary member 11, and is mounted while an end of the shaft 13c is passed through the hole 5b of the insulating base 5 and is positioned in the recess 2k in the bottom wall 2a. When the rotation transmission member 13 is rotated, the rotary member 11 rotates through the shaft 13c and the sliding element 10 comes into sliding contact with the resistance element, so that the resistance is varied. When the rotation transmission member 13 is rotated within a predetermined range, the stopper 13d bumps into the stopper 5d of the holding member 4, so that the rotations of the rotation transmission member 13 and the rotary member 11 are stopped.

A plate-shaped clutch 14 comprises a wave washer formed of a metallic plate having a spring characteristic, and has an annular portion 14b having an opening 14a in the central portion thereof. The clutch 14 is combined and integrated with the rotation transmission member 13 by inserting the stopping portions 13b of the rotation transmission member 13 into the opening 14a. The clutch 14 may also be formed of felt instead of a wave washer.

A geared operating member 15 has a cylindrical portion 15a, a first gear 15b disposed around the outer periphery of the cylindrical portion 15a, and a spline groove 15c disposed in a hollow of the cylindrical portion 15a. The operating member 15 is rotatably supported between the holes 2c and 3c of the respective first and second case portions 2 and 3.

A second gear 16 has toothed portions 16a and 16b having different diameters and disposed at different locations in an axial direction. The second gear 16 is rotatably mounted by supporting a recess in the central portion thereof by the shaft 2d of the first case portion 2, and the toothed portion 16a engages the first gear 15b.

A third gear 17 has toothed portions 17a and 17b having different diameters and disposed at different locations in an axial direction. The third gear 17 is mounted so as to be rotatable around the cylindrical portion 15a as a shaft by inserting the cylindrical portion 15a of the operating member 15 into a hole in the central portion in the third gear 17, and the toothed portion 17a engages the toothed portion 16b of the second gear 16.

A plate-shaped geared wheel 18 serving as a fourth gear and having a flat bottom surface has a gear portion 18a at the outer periphery and a through hole 18b in the central portion. The geared wheel 18 is rotatably mounted by being snappingly stopped by the stopping portions 13b of the rotation transmission member 13 that are inserted in the through hole 18b. The gear portion 18a engages the toothed portion 17b of the third gear 17.

The second gear 16 having the toothed portion 16a engaging the first gear 15b of the operating member 15, the third gear 17, and the geared wheel 18 serving as the fourth gear form a reduction rotation transmission mechanism. The rotation from the operating member 15 is reduced in speed and transmitted to the geared wheel 18 at a termination end through the second and third gears 16 and 17.

When the geared wheel 18 is mounted by the stopping portions 13b, the geared wheel 18, the clutch 14, and the rotation transmission member 13 are integrated, and the plate-shaped clutch 14 is sandwiched between the flat portions of the geared wheel 18 and the rotation transmission member 13, so that a clutch mechanism is formed. The rotation of the geared wheel 18 is transmitted to the rotation transmission member 13 through the clutch 14. When the rotation of the rotation transmission member 13 is stopped, a slip occurs between the geared wheel 18 and the clutch 14 or between the clutch 14 and the rotation transmission member 13, so that the clutch mechanism slips.

When the second case portion 3 is mounted to the first case portion 2 with the geared wheel 18 being accommodated in the first case portion 2, the protrusion 3d forming a shaft at the second case portion 3 is positioned in the through hole 18b of the geared wheel 18 and prevents the movement of the stopping portions 13b, so that the stopping portions 13 are prevented from being dislodged. In addition, an end of the protrusion 3d comes into contact with the flat portion 13a of the rotation transmission member 13 and prevents the rotation transmission member 13 from becoming raised. Further, the protrusion 3d is positioned at the center of the geared wheel 18 and the center of the stopping portions 13b (rotation transmission member 13), so that the protrusion 3d functions as a rotary shaft of the geared wheel 18 and the rotation transmission member 13.

The variable resistor according to the present invention having such a structure is installed in, for example, an automobile. Rotation from a motor (not shown) is transmitted to the operating member 15 having the first gear 15b from a rotary shaft (not shown) engaging the spline groove 15c of the operating member 15.

This causes the rotation of the operating member 15 to be transmitted to the rotary member 11 from the geared wheel 18 and the second and third gears 16 and 17 of the reduction rotation transmission mechanism through the clutch 14 and the rotation transmission member 13 of the clutch mechanism, so that the sliding element 10 slides on the resistance element (not shown). This causes the resistance to be finely varied, so that the tilting of a seat is adjusted.

When the rotation of the geared wheel 18 is continued, the stopper 13d of the rotation transmission member 13 bumps into the stoppers 5d of the holding member 4 and stops rotating, causing the rotary member 11 to also stop rotating, so that the varying of the resistance is stopped.

When the rotation of the geared wheel 18 is further continued, the clutch mechanism slips, so that the transmission of the rotation to the rotation transmission member 13 is stopped.

When the operating member 15 is rotated in a direction opposite to that above, the rotation transmission member 13 rotates in a direction in which stops of the stoppers 5d are set out of contact through the clutch mechanism, so that the resistance is varied. Thereafter, the same operations as those described above are performed.

Although, in the embodiment of the present invention, the resistance member 7 has a cover 12, so that a unitary structure in which the sliding element 10 slides on the resistance element is formed, the variable resistor according to the present invention is not limited thereto.

More specifically, the sliding element and the resistance element do not need to be covered with a cover. A rotary member having a resistance element may rotate with respect to a stationary sliding element.

Further, a resistance substrate having a resistance element may be mounted to, for example, the bottom wall of the case, and a sliding element which slides on the resistance element may be disposed below the rotation transmission member. In this structure, the sliding element functions as the rotary member of the resistance member.

What is claimed is:

1. A variable resistor comprising:
   an operating member rotatably supported by a case and having a gear;
   a reduction rotation transmission mechanism including a plurality of gears for transmitting rotation of the operating member;
   a resistance member having a rotary member for varying resistance; and
   a rotation transmission member for rotating the rotary member,
   wherein a plate-shaped clutch which resiliently contacts a geared wheel and the rotation transmission member is disposed between the geared wheel and the rotation transmission member, so that a clutch mechanism is formed, the geared wheel being disposed at a termination end of the reduction rotation transmission mechanism, wherein the rotation from the operating member is transmitted to the rotary member through the reduction rotation transmission mechanism, the clutch mechanism, and the rotation transmission member to vary resistance, wherein when the rotation of the rotation transmission member is stopped, the clutch mechanism slips to stop varying the resistance, wherein the plate-shaped clutch and the rotation transmission member are made of separate members, wherein the clutch comprises a wave washer formed of a metallic plate having a spring characteristic, wherein the geared wheel has a through hole in a central portion, the rotation transmission member has a plurality of stopping portions which are stopped by the geared wheel as a result of inserting the stopping portions in the through hole, and the rotation transmission member is combined with the geared wheel by the stopping portions, wherein the clutch has an annular portion having an opening in a central portion, and is interposed between the rotation transmission member and the geared wheel by inserting the stopping portions in the opening, and wherein the case has a protrusion, and the stopping portions are prevented from being dislodged from the geared wheel by positioning the protrusion in the through hole of the geared wheel.

2. The variable resistor according to claim 1, further comprising a holding member for holding the resistance member, wherein a stopper for stopping the rotation of the rotation transmission member is disposed between the rotation transmission member and the holding member.

3. The variable resistor according to claim 2, wherein the holding member has a connection conductor for connecting a terminal disposed at the resistance member, and a resistance value of the resistance member is provided to the outside of the case through the connection conductor.

4. The variable resistor according to claim 2, wherein the holding member is caught and stopped by the case by a stopper protrusion of the case.

5. The variable resistor according to claim 1, wherein the rotary member has a hole in a central portion, and the rotation transmission member has a shaft inserted in the hole of the rotary member to transmit the rotation to the rotary member.

6. The variable resistor according to claim 1, wherein the case comprises first and second case portions, a protrusion disposed at one of the first and second case portions, and a stopper arm disposed at the other of the first and second case portions, the case is a box case obtained by catching and stopping the protrusion and the stopper arm with respect to each other, and the case accommodates at least the reduction rotation transmission mechanism, the rotation transmission member, the clutch mechanism, and the resistance member.

7. The variable resistor according to claim 6, wherein the operating member is held between the first and second case portions, and at least one of the gears of the reduction rotation transmission mechanism is rotatably supported by a shaft formed by a protrusion disposed at either one of the first and second case portions.

8. The variable resistor according to claim 6, wherein at least one of the gears of the reduction rotation transmission mechanism is rotatably supported by the operating member.

* * * * *